(12) United States Patent
Angus

(10) Patent No.: US 7,567,207 B2
(45) Date of Patent: Jul. 28, 2009

(54) WIRELESS MOBILE TERMINAL USING SENSORS FOR CONTROLLING AUTONOMOUS AND ASSISTED GPS MODES

(75) Inventor: Allan Douglas Angus, Omaha, NE (US)

(73) Assignee: Gabriel Technologies Corp., Omaha, NE (US)

( * ) Notice: Subject to any disclaimer, the term of this patent is extended or adjusted under 35 U.S.C. 154(b) by 0 days.

(21) Appl. No.: 11/646,207

(22) Filed: Dec. 27, 2006

(65) Prior Publication Data

US 2007/0182630 A1 Aug. 9, 2007

Related U.S. Application Data

(60) Provisional application No. 60/754,436, filed on Dec. 28, 2005, provisional application No. 60/754,359, filed on Dec. 28, 2005.

(51) Int. Cl.
G01S 1/02 (2006.01)
G01S 5/14 (2006.01)

(52) U.S. Cl. ............................. 342/357.06; 342/357.14; 342/463

(58) Field of Classification Search ............ 342/357.06, 342/357.07, 357.09, 357.14, 464, 463; 701/213, 701/215
See application file for complete search history.

(56) References Cited

U.S. PATENT DOCUMENTS

| 6,389,291 | B1 * | 5/2002 | Pande et al. .............. 455/456.5 |
| 7,076,256 | B1 * | 7/2006 | Orler et al. ................ 455/456.1 |
| 2005/0159169 | A1 * | 7/2005 | Humphries et al. ....... 455/456.1 |
| 2005/0162309 | A1 | 7/2005 | Humphries et al. |
| 2005/0163201 | A1 | 7/2005 | Krasner |
| 2005/0179541 | A1 * | 8/2005 | Wolfe ..................... 340/539.22 |
| 2005/0212700 | A1 | 9/2005 | Diggelen et al. |
| 2005/0227709 | A1 | 10/2005 | Chang et al. |
| 2006/0038719 | A1 * | 2/2006 | Pande et al. ............. 342/357.12 |
| 2006/0089765 | A1 * | 4/2006 | Pack et al. ..................... 701/23 |

OTHER PUBLICATIONS

Notification of Transmittal of the International Search Report and the Written Opinion of the International Searching Authority, or the Declaration dated Sep. 24, 2008 in connection with PCT Application No. PCT/US06/49373.

\* cited by examiner

*Primary Examiner*—Dao L Phan

(57) ABSTRACT

A mobile terminal that operates in a plurality of position tracking modes. The mobile terminal comprises a Global Positioning System (GPS) unit for receiving GPS signals from a plurality of GPS satellites. The GPS unit can operate in i) a device autonomous fix (DAF) mode, ii) a server-computed assisted fix (SCAF) mode, and iii) a device-computed assisted fix (DCAF) mode. The mobile station also comprises a network transceiver for communicating with at least one terrestrial wireless network and a controller for controlling the operating mode of the GPS unit. The controller transitions the GPS unit between the DAF mode, the SCAF mode, and the DCAF mode. The controller receives an interrupt signal from at least one sensor and, in response, causes the GPS unit to operate in one of the DAF mode, the SCAF mode, and the DCAF mode.

20 Claims, 3 Drawing Sheets

WIRELESS MOBILE TERMINAL USING SENSORS FOR CONTROLLING AUTONOMOUS AND ASSISTED GPS MODES

CROSS-REFERENCE TO RELATED APPLICATION AND CLAIM OF PRIORITY

The present application is related to U.S. Provisional Patent No. 60/754,436, filed Dec. 28, 2005, entitled "Apparatus And Method For Controlling Autonomous And Assisted GPS Modes In A Wireless Mobile Terminal" and U.S. Provisional Patent No. 60/754,359, filed Dec. 28, 2005, entitled "Wireless Mobile Terminal Using Sensors For Controlling Autonomous And Assisted GPS Modes". U.S. Provisional Patent Nos. 60/754,436 and 60/754,359 are assigned to the assignee of the present application and are hereby incorporated by reference into the present disclosure as if fully set forth herein. The present application hereby claims priority under 35 U.S.C. §119(e) to U.S. Provisional Patent Nos. 60/754,436 and 60/754,359.

The present application is also related to U.S. patent application Ser. No. 11/646,174, entitled "Apparatus And Method For Controlling Autonomous And Assisted GPS Modes In A Wireless Mobile Terminal," and filed concurrently herewith. U.S. patent application Ser. No. 11/646,174, is hereby incorporated by reference as if fully set forth herein.

TECHNICAL FIELD OF THE INVENTION

The present invention relates generally to GPS location devices and, more specifically, to a mechanism for switching a GPS mobile terminal between full autonomous mode and assisted GPS modes.

BACKGROUND OF THE INVENTION

The Global Positioning System (GPS) is a location system that uses signals transmitted by satellites orbiting the earth. Because the GPS satellites provide accurate positioning 24 hours a day anywhere on earth, GPS technology has gained widespread use over the last decade in commercial and military applications. GPS receivers capable of determining geographic position are implemented in cell phones, laptop computers, PDA devices, automobiles and other vehicles, and aircraft. GPS receivers are also implemented as stand-alone portable devices that may be worn, attached to, or carried by a person, animal, vehicle or portable object.

A GPS receiver determines its own position based on the signals transmitted by a select number of satellites that the GPS receiver is capable of receiving. The orbits and locations of GPS satellites are known in advance. This satellite position information is stored in a first data record known as the "almanac". Each GPS satellite continually broadcasts the almanac information in a standard message to GPS receivers on earth. Each GPS receiver automatically collects and stores the almanac information from each satellite that the GPS receiver is able to detect.

However, the orbits of GPS satellites do not perfectly follow the almanac information. Ground-based radar stations monitor the naturally-occurring deviations between the actual position of each GPS satellite and the predicted information in the almanac. This deviation information is stored in a second data record known as the ephemeris. The ephemeris errors for a GPS satellite are transmitted to that GPS satellite, which in turn broadcasts the ephemeris errors as part of the standard message to GPS receivers on earth. Almanac information is useful for about one year before it must be updated. Ephemeris data is useful for about two hours before it must be updated.

Each GPS receiver uses the almanac information and the ephemeris data to determine very precisely the position of a GPS satellite at a given point in time. Once the positions of several GPS satellites are precisely known, a GPS receiver is able to determine the distance to each of the satellites according to the amount of time it takes the GPS signal to travel from the satellite to the GPS receiver. The GPS receiver then uses the distance information for several satellites to determine very precisely the position of the GPS receiver on earth. The GPS receiver information may include latitude information, longitude information, and altitude information (i.e., height above sea level).

The foregoing description is characteristic of a GPS receiver that operates in an autonomous mode. An autonomous GPS receiver determines its position entirely on its own, using only the signals from the GPS satellites. For the purposes of this disclosure, the autonomous mode of operation may also be referred to as "device autonomous fix (DAF)". However, some GPS receivers operate in an assisted GPS (aGPS) mode. In assisted GPS mode, a GPS receiver may receive almanac and ephemeris data, and even position information, from a terrestrial (i.e., ground-based) network with which the GPS receiver may communicate by means of a wireless connection or a wireline connection. For example, a cell phone or wireless PDA containing a GPS receiver may communicate with a public or private wide-area network (WAN) using the CDMA2000 protocol, the GSM protocol, or the IEEE-802.11 protocol (or a similar Wi-Fi protocol.

There are two broad categories under which an assisted GPS receiver may fall. In a first category, a terrestrial network delivers GPS correlation parameters to the measurement engine (ME) of the GPS receiver. The measurement engine uses the correlation parameters to direct the correlators of the GPS receiver to specific search regions for the expected time and frequency offsets for each visible satellite. The measured time and frequency offsets are often called pseudo-ranges (PRs) and pseudo-Dopplers (PDs). Frequently, the set of measured correlation parameters are collectively referred to as pseudo-ranges, even though these parameters include both frequency offset measurements and other parameters.

However, the correlation search parameters may become stale very quickly, perhaps within five minutes or so. To overcome this problem, first and second order correction factors may be sent along with the correlation search parameters in order to allow the GPS receiver to correct for differences between the time at which the correlation data was created and the time at which the correlation data will be used. However, in this first category of assisted GPS mode, the actual calculation of true range, Doppler, time, and accurate position information is completed at a network server with receives from the GPS receiver the approximate location of the GPS receiver, its measured pseudo-range (PR) and pseudo-Doppler (PD) information, and the apparent GPS time at which the pseudo-range (PR) and pseudo-Doppler (PD) information was captured.

Thus, in this first category of aGPS devices, the terrestrial network sends GPS correlation parameters to the measurement engine (ME) of the GPS receiver. The measurement engine of the GPS receiver then sends approximate location, measured pseudo-range and pseudo-Doppler information, and apparent GPS time to the terrestrial network. The server in the terrestrial network uses the information received from the GPS receiver to calculate true range, Doppler, time, and position information and returns this information to the GPS receiver. For the purposes of this disclosure, this first category of assisted GPS mode of operation may also be referred to as "server-computed assisted fix (SCAF)".

In the second category of assisted GPS mode of operation, the terrestrial network delivers to the GPS receiver almanac and ephemeris information that would otherwise be obtained from the GPS satellites at a low rate of 50 bits/second. The terrestrial network delivers the almanac and ephemeris record at a much higher data rate. The GPS receiver operates both a measurement engine (ME) as before and a position engine (PE). The position engine receives the pseudo-range information captured by the measurement engine and calculates the solutions to the GPS equations yielding true range, Doppler, time and position information for the given output of the measurement engine and the ephemeris tables for each visible satellite. This second category of assisted GPS is mobile terminal (MT) based. For the purposes of this disclosure, this second category of assisted GPS mode of operation may also be referred to as "device-computed assisted fix (DCAF)". Also, as ephemeris tables become stale, the GPS receiver may request updated tables from the terrestrial network or may transition from DCAF to full autonomous mode (i.e., DAF).

Most GPS receiver chipsets operate in only one of the available modes: DAF, DCAF, or SCAF. For example, stand-alone GPS units from Magellan or Garmin are typically DAF only. Most of the E911 elements built into CDMA mobile phones operate only in SCAF mode. Many of the GPS units based on the SiRFSTAR model operate only in the DCAF mode. Newer GPS chipsets, such as the Texas Instruments TSL5001, may operate in any of the three modes. However, network configurations do not support a single device that operates in any of the three modes or that can shift dynamically between these modes on a single network.

Tracking persons, animals or objects are among the most important applications for GPS units. Portable GPS units may be worn by, attached to, carried by, or hidden within a person, an animal, a vehicle, or a variety of other movable objects, such as crates, packages, suitcases, briefcases, machinery, and the like. Such portable GPS units typically use battery power. In many applications, the chipset of the GPs units runs in a tracking mode in which location and velocity information are computed continually at a high rate (e.g., once per second). In such a tracking mode, a storage battery may be rapidly exhausted. However, it is important to reserve the battery power until an event occurs that requires tracking, such as the theft of an automobile. There is little value in running a GPS unit in a parked car for several days, only to have the battery run down before the theft occurs.

Therefore, there is a need in the art for an improved portable GPS unit that conserves battery power. In particular, there is a need for a battery-powered GPS unit that operates in tracking modes only when needed and that is able to switch between autonomous mode and assisted mode in order to conserve power.

SUMMARY OF THE INVENTION

To address the above-discussed deficiencies of the prior art, it is a primary object of the present invention to provide a mobile terminal capable of operating in a plurality of position tracking modes. According to an advantageous embodiment of the present invention, the mobile terminal comprises: 1) a Global Positioning System (GPS) unit capable of receiving GPS signals from a plurality of GPS satellites, wherein the GPS unit is further capable of operating in i) a device autonomous fix (DAF) mode, ii) a server-computed assisted fix (SCAF) mode, and iii) a device-computed assisted fix (DCAF) mode; 2) a network transceiver capable of communicating with at least one terrestrial wireless network; 3) a controller capable of controlling the operating mode of the GPS unit, wherein the controller is capable of transitioning the GPS unit between the DAF mode, the SCAF mode, and the DCAF mode; and 4) at least one sensor associated with the mobile terminal capable of generating an interrupt signal, wherein the controller receives the interrupt signal and in response thereto causes the GPS unit to operate in one of the DAF mode, the SCAF mode, and the DCAF mode.

According to one embodiment of the present invention, the controller, in response to receipt of the interrupt signal, is further capable of transitioning the mobile terminal from a reduced power state to an active state.

According to another embodiment of the present invention, the controller causes the GPS unit to operate in one of the DAF mode, the SCAF mode, and the DCAF mode depending on the type of the at least one sensor.

According to still another embodiment of the present invention, the at least one sensor is a timer and the controller causes the GPS unit to operate in one of the DAF mode, the SCAF mode, and the DCAF mode in response to receipt of the interrupt signal from the timer, wherein the interrupt signal indicates that a time period has expired in the timer.

According to yet another embodiment of the present invention, the at least one sensor is a motion detector and the controller causes the GPS unit to operate in one of the DAF mode, the SCAF mode, and the DCAF mode in response to receipt of the interrupt signal from the motion detector, wherein the interrupt signal indicates that the mobile terminal is in motion.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
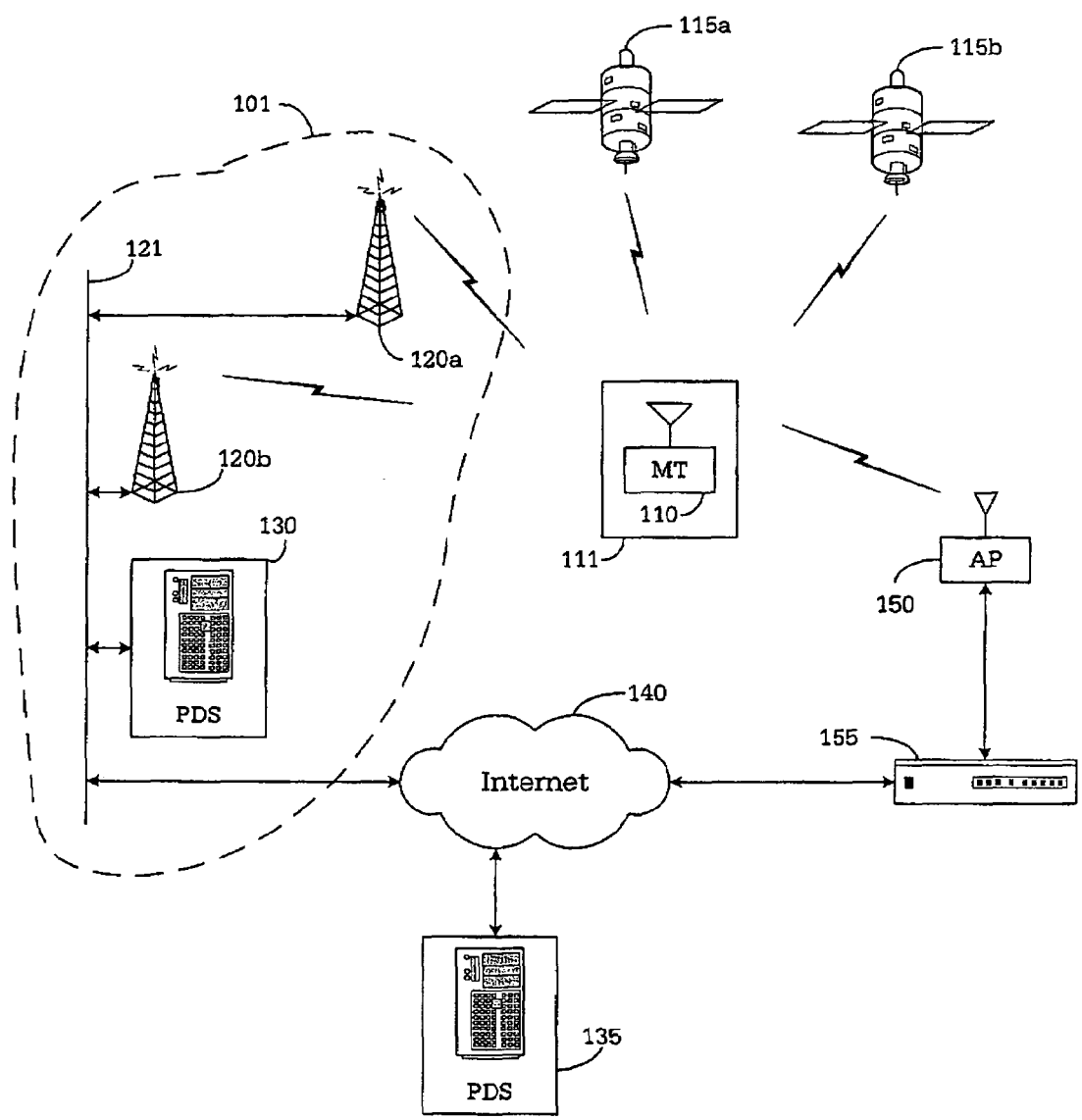
FIG. 1 illustrates a mobile terminal having GPS capability operating in a wireless network environment according to the principles of the present invention.
Figure 2:
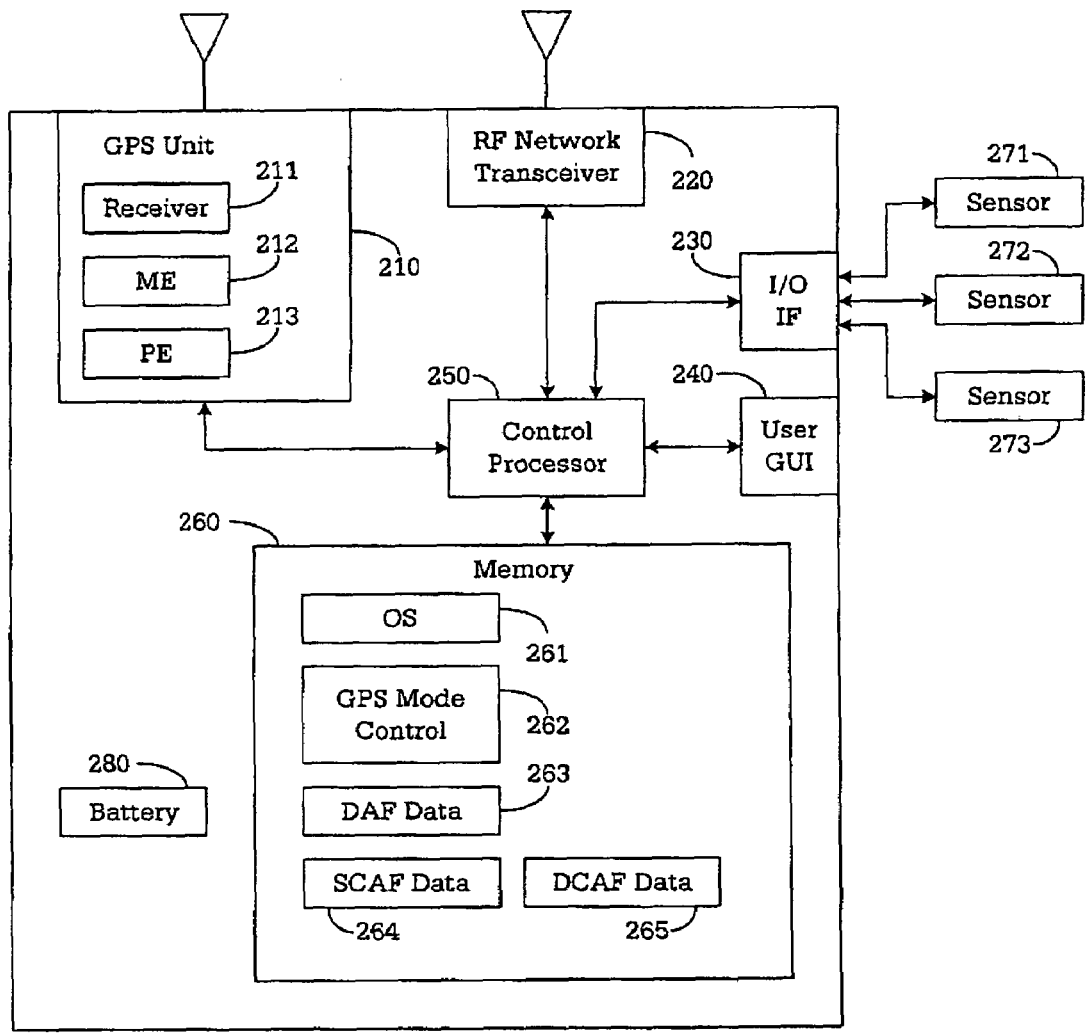
FIG. 2 illustrates the GPS-capable mobile terminal in FIG. 1 in greater detail according to an exemplary embodiment of the present invention.
Figure 3:
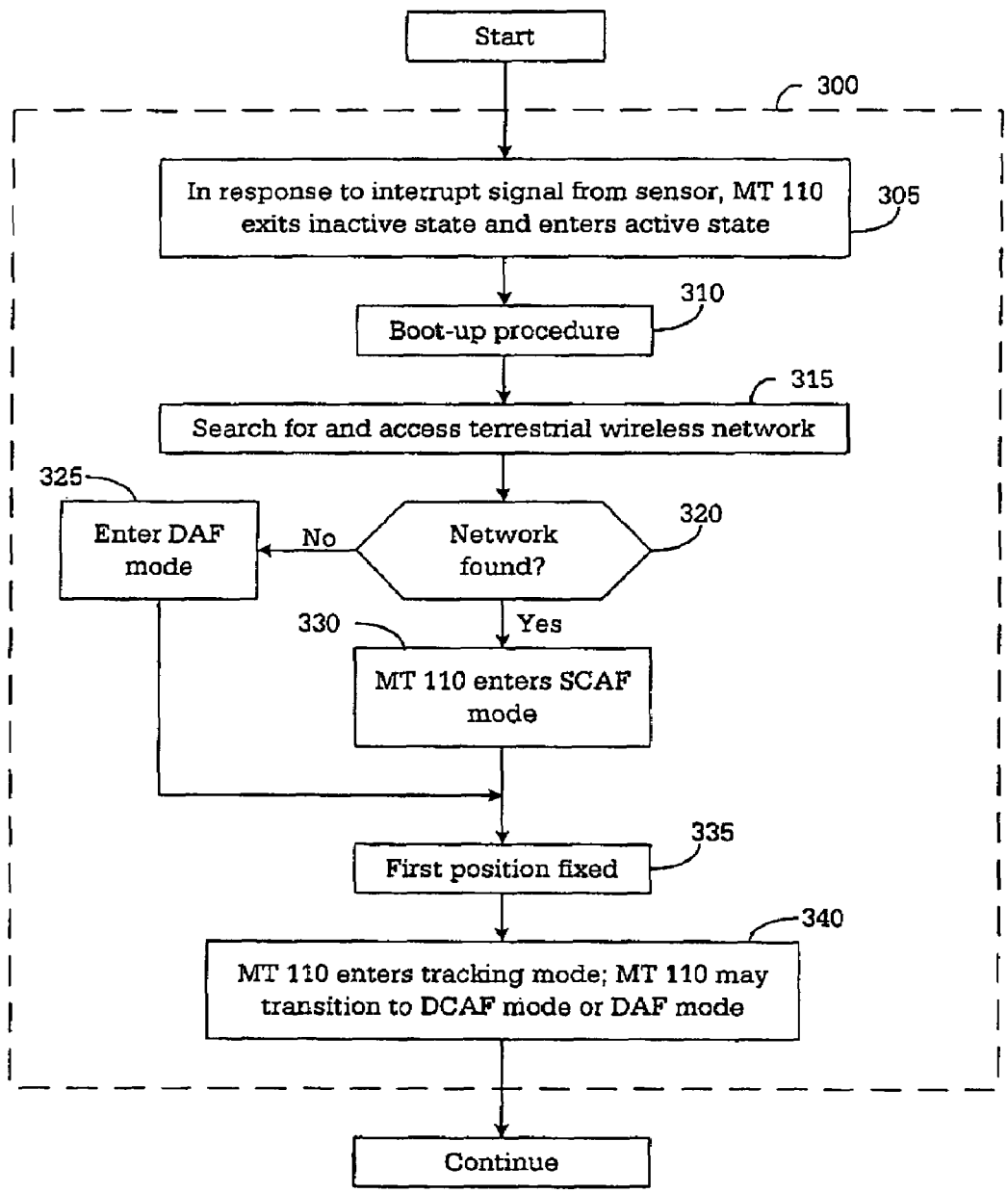
FIG. 3 is a flow diagram illustrating a procedure by which the GPS-capable mobile terminal uses sensor-driven interrupts to obtain position information and to operate in tracking mode according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged mobile terminal having assisted GPS capability.

FIG. 1 illustrates GPS-capable mobile terminal 110 operating in a wireless network environment according to the principles of the present invention. Mobile terminal (MT) 110 comprises a Global Positioning System (GPS) unit capable of receiving GPS signals from a constellation of GPS satellites, including exemplary GPS satellites 115a and 115b, and determining the position of MT 110. In the exemplary embodiment, MT 110 further comprises at least one radio-frequency (RF) transceiver capable of communicating with one or more types of terrestrial wireless networks, including both wide-area networks (WANs) and short-range networks, also called personal area networks (PANs).

Mobile terminal 110 may comprise any one of a wide variety of electronic devices, including cell phones, laptop computers, PDA devices, and the like. Mobile terminal 110 also may be a component device, such as a navigation system, implemented in an automobile or other vehicle, a boat or an aircraft. However, in an advantageous embodiment, mobile terminal 110 may comprise a battery-operated portable device that may be worn by, attached to, or carried by a person or an animal. Mobile terminal 110 also may comprise a battery-operated portable device that may be attached to, or embedded within, vehicle 111 or other movable object 111, such as a crate, package, suitcase, briefcase, machinery, or the like. For example, mobile terminal 110 may be a battery-operated anti-theft tracking device embedded within automobile 111.

In one embodiment, mobile terminal 110 is capable of communicating with base stations 120a and 120b of wireless network 101 (indicated by dotted line), which may be a public cellular wide area network (WAN) according to, for example, CDMA protocol, GSM protocol, or the like. In another embodiment, wireless network 101 may be a public or private wireless network according to, for example, OFDMA protocol or IEEE-802.16, or the like. In still another embodiment, wireless network 101 may be a two-way paging network, such as a ReFLEX paging network. In yet another embodiment, mobile terminal 110 is also capable of communicating with access point (AP) 150 of a short range wireless network, according to, for example, IEEE-802.11 protocol, Bluetooth protocol, or a similar WiFi protocol. Access point 150 and router 155 may be implemented in a home or office in order to provide access to Internet 140.

Mobile terminal 110 may use different types of RF transceivers to communicate with different types of terrestrial wireless networks. However, according to an advantageous embodiment of the present invention, mobile terminal 110 may communicate with terrestrial wireless networks using at least one reconfigurable RF transceiver based on software-defined radio (SDR) architecture. For example, mobile terminal 110 may use a first SDR transceiver to communicate with wide area networks according to at least CDMA protocol and GSM protocol and may use a second SDR transceiver to communicate with WiFi networks according to at least Bluetooth protocol and IEEE-802.11 protocol. In still another embodiment of the present invention, mobile terminal 110 may use a single SDR transceiver to communicate with both wide-area networks and short-range networks. Moreover, mobile terminal 110 is capable of supporting both voice traffic, as in older IS-95 and GSM networks, and data traffic, especially IP packets, as in newer OFDMA and IEEE-802.16 networks.

According to the principles of the present invention, the GPS unit in mobile terminal 110 is capable of operating in both autonomous GPS mode (i.e., DAF) and assisted GPS modes (i.e., SCAF and DCAF). In an exemplary embodiment, the GPS unit in mobile terminal 110 may be based on a Texas Instruments TSL5001 chipset that can operate in device autonomous fix (DAF) mode, device-computed assisted fix (DCAF) mode, or server-computed assisted fix (SCAF) mode. In DCAF or SCAF mode, mobile terminal 110 may receive GPS assistance from position determining server (PDS) 130, which is associated with wireless network 101. PDS 130 and base stations 120a and 120b communicate via wireline network 121, which may be, for example, a Gigabit Ethernet or a similar wireline network.

However, if the capabilities of PDS 130 do not match the capabilities of mobile terminal 110, mobile terminal 110 may receive GPS assistance from position determining server (PDS) 135, which is not associated with wireless network 101. For example, mobile terminal 110 may normally operate in SCAF mode in its home network. However, if mobile terminal 110 is roaming in wireless network 101 and PDS 130 provides supports only for DCAF mode, mobile terminal 110 accesses PDS 135 in order to obtain SCAF support. Mobile terminal 110 may access PDS 135 via base station 120 of wireless network 101 and Internet 140. Alternatively, if mobile terminal (MT) 110 is relatively close to access point (AP) 150, MT 110 may access Internet 140 via AP 150 and router 155.

FIG. 2 illustrates GPS-capable mobile terminal 110 in greater detail according to an exemplary embodiment of the present invention. Mobile terminal (MT) 110 comprises GPS unit 210, radio frequency (RF) network transceiver 220, input/output interface (I/O IF) 230, user graphical user interface 240, controller processor 250, memory 260, and battery 280. Memory 260 comprises both volatile and non-volatile memories that store operating system (OS) program 261, GPS mode control program 262, device autonomous fix (DAF) data file 263, server-computed assisted fix (SCAF) date file 264, and device-computed assisted fix (DCAF) date file 265.

Together, controller processor 250 and memory 260 comprise a controller that controls the overall operation of mobile terminal 110 and the operations of the component parts of MT 110. Control processor 250 executes GPS mode control program 262 in order to control the transition of MT 110 between DAF, DCAF and SCAF modes. User GUI 240 may comprise an optional display and some type of input device, such as control buttons or a touch screen, that enable an operator to activate and to control MT 110.

Control processor 250 may communicate with external peripheral devices and/or networks via I/O IF 230. In particular, control processor 250 may communicate with one or more external sensors, such as exemplary sensors 271-273. According to the principles of the present invention, control processor 250 uses control signals received from one or more of sensors 271-273 to activate mobile terminal 110 from a dormant state, to put mobile terminal 110 into an assisted GPS mode to obtain a first position fix, and then to transition into a tracking mode. In this manner, control processor 250 optimizes the life of battery 280, which provides power to all of MT 110 and, optionally, to one or more of sensor 271, sensor 272 and sensor 273. Although sensors 271-273 are external sensors in the illustrated embodiment, this is not a requirement. Alternatively, one or more of sensors 271-273 may be internal sensors within mobile terminal 110.

RF network transceiver 220 comprises at least one reconfigurable RF transceiver based on software-defined radio (SDR) architecture that is capable of communicating with terrestrial wireless networks. In an advantageous embodiment of the present invention, RF network transceiver 220 may comprise a first reconfigurable SDR transceiver that communicates with different types of wide-area networks (including wireless network 101), according to at least two wide-range communication protocols. RF network transceiver 220 also may comprise a second reconfigurable SDR transceiver that communicates with different types of short-range (or WiFi) networks according to at least two short-range communication protocols. In still another embodiment of the present invention, transceiver 220 may comprises a single reconfigurable SDR transceiver that communicates with both wide-area networks and short-range networks.

GPS unit 211 comprises receiver section 211, measurement engine 212, and position engine 213. Receiver section 211 receives and down-converts the incoming GPS signals from several of the satellites 115 in the constellation of GPS satellites. In SCAF mode, measurement engine 212 uses correlation parameters received from a terrestrial network (i.e., PDS 130 or PDS 135) to direct the correlators of receiver section 211 to specific regions for the expected time and frequency offsets for each visible satellite. To compensate for stale correlation search parameters, measurement engine 212 also provides receiver section 211 with first-order and second-order correction factors to correct for differences between the time at which the correlation data was created and the time at which the correlation data will be used. Alternatively, the mobile terminal may employ its processor and an algorithm for the application of the correction factors to the nominal correlation search parameters in order to compensate for any significant difference in the intended and actual times of application. In such an embodiment, the corrected correlation search parameters would be delivered to the GPS unit.

Measurement engine 212 stores the measured time and frequency offsets, or pseudo-ranges (PRs) and pseudo-Dopplers (PDs), in SCAF data file 254 via control processor 250. Control processor 250 also relays the information stored in SCAF data file 254 to RF network transceiver 220. Transceiver 220 transmits the information from SCAF data file 254 to PDS 130 or PDS 135. The actual calculation of true range, Doppler, time, and accurate position information is completed at PDS 130 (or PDS 135). Then, PDS 130 (or PDS 135) transmits the true range data, Doppler data, time data, and accurate position information back to MT 110 via wireless network 101 or via AP 150, as the case may be.

In DCAF mode, measurement engine 212 uses almanac and ephemeris information from the terrestrial network (i.e., PDS 130 or PDS 135) at a high data rate. Position engine 213 receives the pseudo-range (and pseudo-Doppler) information captured by measurement engine 212 and calculates the solutions to the GPS equations yielding true range, Doppler, time and position information for the given output of measurement engine 212 and the ephemeris tables for each visible satellite. Position engine 213 then stores this data in DCAF data file 265 via control processor 250.

In DAF mode, mobile terminal 110 does not use any information received from the terrestrial network to determine position. Instead, measurement engine 212 receives almanac and ephemeris information at a low data rate (e.g., 50 bits/second) directly from GPS satellites 115 and measures pseudo-range and pseudo-frequency information. Position engine 213 then the pseudo-range and pseudo-Doppler information to calculate true range, Doppler, time and position information for the given output of measurement engine 212 and the ephemeris tables for each visible satellite. The calculated information is then stored in DAF data file 263. This means of determining position requires the most time to acquire a first position fix.

According to the principles of the present invention, sensors 271-273 provide control signals that communicate with control processor 250 and activate a tracking mode that records and relays the position of mobile terminal 110. Sensors 271-273 may comprise any one of a wide variety of sensors, including a simple timer, a motion detector (i.e., accelerometer), an inertial device (e.g., gyroscope, Hall effect device), or a speedometer, a tachometer, an ignition switch, or a sensor associated with the alternator or generator of vehicle 111.

In order to conserve power, mobile terminal 110 may be put into a "sleep mode" in which one or more of the components of MT 110 are powered down, particularly GPS unit 210 and RF network transceiver 220. In this sleep mode, however, one or more of sensors 271-273 remains active and can interrupt (and even power on) control processor 250 if a certain type of triggering event occurs. Mobile terminal 110 may then activate a tracking mode in which GPS unit 210 enters an assisted GPS mode (i.e., SCAF or DCAF) and then, if warranted, transitions to fully autonomous mode (i.e., DAF mode).

FIG. 3 depicts flow diagram 300, which illustrates a procedure by which GPS-capable mobile terminal 110 uses sensor-driven interrupts to obtain position information and to operate in a tracking mode according to the principles of the present invention. Initially, it is assumed that mobile terminal 110 is in an inactive state (or reduced power state) in order to conserve battery power. In response to an interrupt signal received from one of sensors 371-373, control processor 250 and MT 110 exit the inactive state and enter an active state (process step 305). Next, MT 110 goes through a boot-up procedure (process step 310).

After the boot-up procedure is completed, mobile terminal 110 may search for, and attempt to access, either a base station of wireless network 101 or access point 150, or both (process step 315). If a terrestrial network is not found (process step 320), mobile terminal 110 may enter device autonomous fix (DAF) mode, if desired (process step 325). MT 110 may enter DAF mode depending on the type of sensor (e.g., a timer) that generates the interrupt signal. For example, MT 110 may require a position fix after the expiration of a timer (i.e., once every hour) in order to determine whether or not MT 110 has moved in the last hour. Alternatively, if a motion sensor generated the interrupt signal, MT 110 may be required to enter tracking mode, even if a terrestrial network cannot be detected.

If a terrestrial network is found (process step 320), mobile terminal 110 may enter SCAF mode if desired (process step 330). Alternatively, if the capabilities of PDS 130 do not support SCAF mode, MT 110 may access PDS 135 in order to enter SCAF mode. If PDS 135 also does not support SCAF mode, MT 110 may enter DCAF mode, instead. MT 110 may enter the SCAF mode (or DCAF mode) depending on the type of sensor (e.g., motion detector) generating the interrupt signal. For example, MT 110 may require a position fix if a motion detector sensor determines that vehicle 111 is moving or if an ignition switch sensor determines that the engine of vehicle 111 has been started.

After performing an SCAF operation or DCAF operation in step 330 or a DAF operation in step 325, MT 110 finally obtains an accurate first position fix (process step 335). At this point, MT 110 may return to inactive mode, depending on the type of sensor that generated the interrupt signal. For example, if a timer expired, thereby requiring MT 110 to determine if MT 110 had been moved since its previous position fix, MT 110 may return to an inactive state (i.e., reduced power mode) if it is determined that MT 110 has not moved.

However, it is assumed in FIG. 3 that MT 110 has been interrupted by a motion detector sensor or other sensor indicating that MT 110 is in motion. As a result, MT 110 remains in active state and enters a tracking mode during which MT 110 continually obtains position information (process step 340). Thereafter, mobile terminal 110 may remain in the SCAF mode, DCAF mode or DAF mode that MS 110 operated in previously. Assuming MT 110 started in SCAF mode, MT 110 may later transition from SCAF mode to DCAF mode or to DAF mode in response to another interrupt signal from a sensor or in response to an internal event in MT 110, or in response to the loss of communication with the terrestrial network.

As MT 110 continues to operate in tracking mode, MT 110 may store position information in memory 260 for later transfer to an external device. Alternatively, MT 110 may contemporaneously transmit the recorded position information to an external tracking station via wireless network 101 or AP 150.

Although the present invention has been described with an exemplary embodiment, various changes and modifications may be suggested to one skilled in the art. It is intended that the present invention encompass such changes and modifications as fall within the scope of the appended claims.

What is claimed is:

1. A mobile terminal capable of operating in a plurality of position tracking modes comprising:
    a Global Positioning System (GPS) unit capable of receiving GPS signals from a plurality of GPS satellites, wherein the GPS unit is further capable of operating in 1) a device autonomous fix (DAF) mode, 2) a server-computed assisted fix (SCAF) mode, and 3) a device-computed assisted fix (DCAF) mode;
    a network transceiver capable of communicating with at least one terrestrial wireless network;
    a controller capable of controlling the operating mode of the GPS unit, wherein the controller is capable of transitioning the GPS unit between the DAF mode, the SCAF mode, and the DCAF mode; and
    at least one sensor associated with the mobile terminal capable of generating an interrupt signal, wherein the controller receives the interrupt signal and in response thereto causes the GPS unit to operate in one of the DAF mode, the SCAF mode, and the DCAF mode.

2. The mobile terminal as set forth in claim 1, wherein the controller, in response to receipt of the interrupt signal, is further capable of transitioning the mobile terminal from a reduced power state to an active state.

3. The mobile terminal as set forth in claim 1, wherein the controller causes the GPS unit to operate in one of the DAF mode, the SCAF mode, and the DCAF mode depending on the type of the at least one sensor.

4. The mobile terminal as set forth in claim 3, wherein the at least one sensor is a timer and the controller causes the GPS unit to operate in one of the DAF mode, the SCAF mode, and the DCAF mode in response to receipt of the interrupt signal from the timer, wherein the interrupt signal indicates that a time period has expired in the timer.

5. The mobile terminal as set forth in claim 3, wherein the at least one sensor is a motion detector and the controller causes the GPS unit to operate in one of the DAF mode, the SCAF mode, and the DCAF mode in response to receipt of the interrupt signal from the motion detector, wherein the interrupt signal indicates that the mobile terminal is in motion.

6. The mobile terminal as set forth in claim 3, wherein the controller is capable of accessing via the network transceiver a first remote server associated with the terrestrial wireless network when the GPS unit is operating in the SCAF node, and wherein the controller receives from the first remote server correlation parameters to be used by the GPS unit.

7. The mobile terminal as set forth in claim 6, wherein the controller is capable of accessing via the network transceiver a second remote server not associated with the terrestrial wireless network when the GPS unit is operating in the SCAF node, and wherein the controller receives from the second remote server correlation parameters to be used by the GPS unit.

8. The mobile terminal as set forth in claim 7, wherein the controller accesses the second remote server if the first remote server does not support the SCAF mode of operation of the GPS unit.

9. The mobile terminal as set forth in claim 7, wherein the at least one terrestrial wireless network comprises a wide-area network.

10. The mobile terminal as set forth in claim 9, wherein the at least one terrestrial wireless network comprises one of a cellular network and a paging network.

11. The mobile terminal as set forth in claim 3, wherein the at least one terrestrial wireless network comprises a short-range wireless network.

12. The mobile terminal as set forth in claim 11, wherein the at least one terrestrial wireless network comprises one of a WiFi network and a Bluetooth network.

13. The mobile terminal as set forth in claim 3, wherein the controller is capable of accessing via the network transceiver a first remote server associated with the terrestrial wireless network when the GPS unit is operating in the DCAF node, and wherein the controller receives from the first remote server almanac information and ephemeris information to be used by the GPS unit.

14. The mobile terminal as set forth in claim 13, wherein the controller is capable of accessing via the network transceiver a second remote server not associated with the terrestrial wireless network when the GPS unit is operating in the DCAF node, and wherein the controller receives from the second remote server almanac information and ephemeris information to be used by the GPS unit.

15. The mobile terminal as set forth in claim 14, wherein the controller accesses the second remote server if the first remote server does not support the DCAF mode of operation of the GPS unit.

16. The mobile terminal as set forth in claim 14, wherein the at least one terrestrial wireless network comprises a wide-area network.

17. The mobile terminal as set forth in claim 16, wherein the at least one terrestrial wireless network comprises at least one of a cellular network and a paging network.

18. The mobile terminal as set forth in claim 14, wherein the at least one terrestrial wireless network comprises a short-range wireless network.

19. The mobile terminal as set forth in claim 18, wherein the at least one terrestrial wireless network comprises a WiFi network.

20. The mobile terminal as set forth in claim 18, wherein the at least one terrestrial wireless network comprises a Bluetooth network.

* * * * *